United States Patent
Leach et al.

(10) Patent No.: US 7,745,025 B2
(45) Date of Patent: Jun. 29, 2010

(54) FUEL CELL BASED RECHARGABLE POWER PACK SYSTEM AND ASSOCIATED METHODS FOR CONTROLLING SAME

(75) Inventors: David H. Leach, Albany, NY (US); Russel Marvin, Goshen, CT (US)

(73) Assignee: MTI Microfuel Cells Inc., Albany, NY (US)

( * ) Notice: Subject to any disclaimer, the term of this patent is extended or adjusted under 35 U.S.C. 154(b) by 1140 days.

(21) Appl. No.: 11/353,755

(22) Filed: Feb. 14, 2006

(65) Prior Publication Data

US 2007/0190369 A1 Aug. 16, 2007

(51) Int. Cl.
*H01M 12/00* (2006.01)
*H01M 8/04* (2006.01)
*H01M 2/00* (2006.01)
*H01M 10/44* (2006.01)
*H02J 7/00* (2006.01)
*H02J 7/04* (2006.01)

(52) U.S. Cl. .............................. 429/9; 429/22; 429/61; 429/149; 320/101; 320/103; 320/119; 320/140

(58) Field of Classification Search .................. 429/34, 429/12, 22, 340, 33; 320/116; 364/492
See application file for complete search history.

(56) References Cited

U.S. PATENT DOCUMENTS

| | | | |
|---|---|---|---|
| 4,931,947 A * | 6/1990 | Werth et al. .................. | 700/297 |
| 5,229,705 A | 7/1993 | Kato | |
| 6,104,162 A | 8/2000 | Sainsbury et al. | |
| 6,504,339 B2 | 1/2003 | Parks et al. | |
| 6,590,370 B1 | 7/2003 | Leach | |
| 6,680,547 B1 | 1/2004 | Dailey | |
| 6,703,722 B2 | 3/2004 | Christensen | |
| 6,787,259 B2 | 9/2004 | Colborn et al. | |

(Continued)

FOREIGN PATENT DOCUMENTS

EP 1 434 329 A2 6/2004

(Continued)

OTHER PUBLICATIONS

International Search Report, International Application No. PCT/US2007/003430, Jul. 9, 2007, 9 pages.

*Primary Examiner*—Jonathan Crepeau
*Assistant Examiner*—Kenneth Douyette
(74) *Attorney, Agent, or Firm*—Cesari and McKenna LLP

(57) ABSTRACT

A power pack system for charging a set of isolated batteries is provided. In an illustrative embodiment of the invention, a single fuel cell, a single DC-DC converter and a single system controller device comprises the power-generation side of the power pack. A set of switches is used to connect the power-generation side of the Power pack to one of the isolated batteries in the power pack, thereby recharging that particular battery in the battery power pack set. A battery protection and powerpath control device communicates with the system controller to determine which switches are to be closed depending upon which battery requires recharging. During normal operation the switches will follow the direction from the system controller. If a fault is detected by the battery protection circuit, the protection circuit will take priority and turn off the appropriate switch(es).

10 Claims, 14 Drawing Sheets

U.S. PATENT DOCUMENTS

| | | |
|---|---|---|
| 6,806,678 B2 | 10/2004 | Holmes |
| 6,924,055 B2 | 8/2005 | Hirsch et al. |
| 2003/0113595 A1 | 6/2003 | Jungreis |
| 2004/0009381 A1* | 1/2004 | Sakai et al. .................. 429/23 |
| 2004/0147971 A1 | 7/2004 | Greatbatch et al. |
| 2004/0175598 A1 | 9/2004 | Bliven et al. |

FOREIGN PATENT DOCUMENTS

| | | |
|---|---|---|
| WO | WO 02/067346 A2 | 8/2002 |
| WO | WO 03/088446 A1 | 10/2003 |

* cited by examiner

FUEL CELL BASED RECHARGABLE POWER PACK SYSTEM AND ASSOCIATED METHODS FOR CONTROLLING SAME

BACKGROUND OF THE INVENTION

1. Field of the Invention

This invention relates to fuel cell systems that include fuel cells and rechargeable batteries for various power needs.

2. Background Information

Many electrically powered devices, including commercial and military applications require a reliable battery with high-energy density and long life. There are numerous conventional techniques and components for charging rechargeable batteries such as lithium ion batteries which are widely used in both consumer and military electronic applications. Typically an A/C wall outlet or a 12 volt DC source commonly provided in vehicles can be used for a power source for such recharging. However, such power sources may not be available and a portable recharging device is required.

Use of a fuel cell in the power source for use as a battery recharger for a battery which is powering a portable device has been described in commonly owned U.S. Pat. No. 6,590,370, of Leach, for a SWITCHING DC-DC POWER CONVERTER AND BATTERY CHARGER FOR USE WITH DIRECT OXIDATION FUEL CELL POWER SOURCE, which issued on Jul. 8, 2003, which is currently herein incorporated by reference in its entirety.

Many commonly used battery power packs include two isolated batteries which can be connected in different ways depending on the user's needs. For example, most portable battery poweredelectronic equipment runs on either a 10-15 volt (V) low-voltage rail or a 20-30V high voltage rail. Rather than requiring two different battery types to be carried, a power pack will include two isolated 10-15V batteries with a plus and minus of each battery terminal being available on a multi-pin output connector. The user thus has the option of connecting the batteries in parallel, series, or leaving them independent to meet the power needs of the equipment.

Primary batteries are normally used where continuous, reliable operation is highly desireable because of their higher energy density and longer life as compared to rechargeable batteries. Users would prefer to commence with a fully charged battery because existing primary batteries do not have an indicator showing the amount of charge left. For this reason, many batteries are thrown away with useful life left in them. Rechargeable batteries would thus be encouraged; however, a person can not be assured that they would remain charged and would be ready at all times. A power pack that uses a fuel cell to continuously recharge the batteries so that they act essentially as primary batteries would be desired.

Batteries typically include battery protection circuits, which include switches which are used to protect the battery from under or over voltage conditions or excessive charge or discharge currents. A battery normally is packaged with it's protection circuit attached and two wires coming out of the package. To achieve all of the functionality desired of a fuel cell battery hybrid power pack, such as disconnecting the load while continuing to recharge the battery with the fuel cell power, or bypassing the battery to charge an external battery connected to the load pins, additional switches are required. However, the switches have an on resistance that results in power loss while current is flowing through the switch. It would be advantageous to have a switch network that both protects the battery and minimizes the number of switches, and therefore the total resistance, of all the current paths in the system.

It is thus object of the present invention to provide a power pack that uses one or more fuel cells as a primary energy source to charge one or more isolated rechargeable batteries so that external equipment can draw power from any of the battery(ies).

It is also an object of the invention to provide a fuel cell system that uses one or more fuel cells and one or more rechargeable batteries which can also be used to charge one or more additional external batteries.

It is also noted that a fuel cell system requires power to start (for pumps, fans, etc.), after which the fuel cell output power can be used to maintain operation. Normally this start-up power comes from a battery that is part of the power pack. It is another object of the invention to provide a mechanism by which an external power source can be used to jump-start the system even if all internal batteries are discharged.

It is yet a further object of the invention to provide an improved power pack which minimizes the number of components, such as switches, that are in the powerpath between the fuel cell(s), batteries, and the load(s).

SUMMARY OF THE INVENTION

The disadvantages of prior techniques have been overcome by the present invention which is a fuel cell based power pack system that has functionality that separates the fuel cell charging current path to the battery from the load current path from the battery.

Each embodiment of the power pack system of the present invention includes at least one fuel cell and one or more isolated rechargeable batteries that can be connected externally (series, parallel, isolated) as required to power external equipment. A battery protection circuit monitors the voltage and current of each battery and disconnects the battery if it's voltage or current limits are exceeded.

In a first embodiment of the invention, a fuel cell is used in connection with a DC-DC converter and a system controller which includes a microprocessor programmed in accordance with the invention, as well as various individual components including fans, pumps, valves, pressure transducers, temperature transducers and the like. The controller and additional components are referred to herein as the "system controller and balance of plant." This power-generation side of the circuit provides power to a battery and or load connected to the battery output terminals through a battery protection and power path control circuit associated with that battery. To achieve two isolated batteries in the power pack, this embodiment includes a second fuel cell and DC-DC converter combination that provides power to a second battery, which has its own battery protection and power path control circuit. The user can connect the batteries to draw on either one or both batteries either together or independently.

In a second embodiment of the invention, one fuel cell is coupled to a first DC-DC converter which provides power to a first battery. A second, isolated DC-DC converter draws power from either the fuel cell or the first battery and is used to provide power to a second isolated battery in the power pack.

In another embodiment of the invention, a single fuel cell powered by an internal battery and a set of isolation switches connect a non-isolated DC-DC converter to either the first battery or the second battery. The control logic for the switches acts to keep the batteries at the same state of charge so that they charge or discharge substantially together. The logic directs charging current to the battery with the lowest state of charge until it is slightly more charged than the other battery and then directs current to the other battery until it is slightly more charged than the first battery and so on. The drivers for the switches in the switch network can be powered from either the fuel-cell side or the battery side of the switches.

In each of the embodiments, a battery protection and power pack control circuit protects the battery from excessive currents and over or under voltage conditions.

In an illustrative embodiment of the invention, a single fuel cell, a single DC-DC converter and a single system controller device comprise the power-generation side of the power pack. A switching side includes a switch network that includes a set of switches that connect the power-generation side of the power pack to one of the isolated batteries in the power pack, thereby recharging that particular battery in the battery power pack set. A battery protection and power path control device communicates with the system controller to determine which switches are to be closed depending on which battery requires recharging. During normal operation the switches will follow the direction from the system controller. If a fault is detected by the battery protection circuit, the protection circuit will take priority and turn off the appropriate switch(es). An isolated communication interface is provided for communicating between the switch drivers associated with each isolated battery and the fuel cell side of the circuit.

The power pack of the present invention can be used with its rechargeable batteries to charge one or more auxiliary batteries. In addition, such auxiliary batteries or another available power source can be used to jump-start the fuel cell power source when the internal batteries contained therein have been fully discharged.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
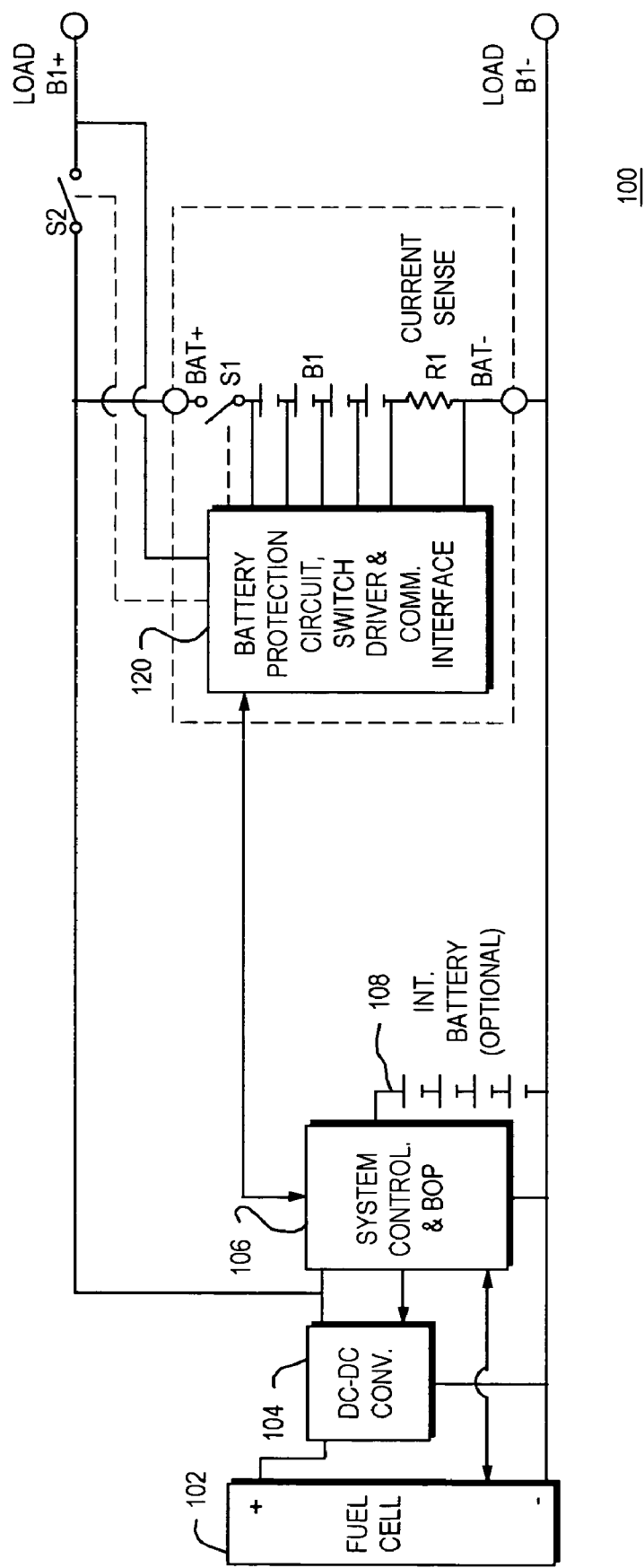
FIG. 1 is a schematic block diagram of a fuel-cell battery power pack with a single battery output that makes use of a battery protection circuit modified to allow the system controller to turn the switches on and off during non-fault conditions in accordance with an illustrative embodiment of the present invention.

FIG. 1 is a schematic block diagram of a fuel-cell battery power pack with a single battery output that makes use of a battery protection circuit modified to allow the system controller to turn the switches on and off during non-fault conditions in accordance with an illustrative embodiment of the present invention. More specifically, FIG. 1 illustrates a power pack 100 that includes a fuel cell 102, a DC-DC converter 104 and a system controller and balance of plant 106, which is powered either by the optional internal battery 108 or the main battery B1. As noted, the system controller and balance of plant 106 includes items such as the fans, pumps, valves, and sensors necessary to operate the fuel cell 102. A rechargeable battery B1 with a battery protection circuit 120 and a load disconnect switch S2, as well as the DC-DC converter 104 are controlled in the manner described in the above-cited U.S. Pat. No. 6,590,370.

In operation, the output voltage of a fuel cell 102 is provided to DC-DC converter 104. The direct oxidation fuel cell 102 serves as a power source for the converter 104. The fuel cell 102 is preferably implemented as a stack of direct methanol fuel cells, but should be understood that other configurations, such as a planar arrangement, or a single fuel cell and/or other types of direct oxidation fuel cells may be used within the scope of the present invention, and thus, as used herein, the word "fuel cell" shall include one or more of the aforementioned configurations. The battery B1 may be of any chemistry and comprised of one or more cells in series and/or parallel combinations. The protection circuit 120 is similar to protection circuits that are readily available from third party manufacturers as will be understood by those skilled in the art, except it has been modified to allow the system controller 106 to turn the switches on and off during non-fault conditions.

Fuel cell 102 is connected directly to converter 104 such that the output voltage of the fuel cell 102 is the input voltage to the DC-DC converter 104. The output voltage of the DC-DC converter 104 is provided to a battery protection and power path control circuit 120 which protects battery B1. The power path control circuit 120 is in turn connected to battery B1, to which a load can be connected in the manner desired by the user. Consequently, the output voltage of the DC-DC converter 104 equals the battery voltage and the output current will either charge the battery or aid the battery in supplying current.

As noted herein, the fuel cell 102 and the DC-DC power converter 104 are controlled by a number of components including a system controller 106, which includes a microprocessor programmed in accordance with the invention, as well as various individual components including fans, pumps, valves, pressure transducers and temperature transducers and the like. The controller and additional components are referred to herein as the "system controller and balance of plant block" The system controller and balance of plant block for the battery B1 is designated in FIG. 1 by reference character 106.

The power pack 100 can be connected to any of the following at it's load terminals Load B1+ and Load B1−: 1) a load that is to be powered by the power pack that can accept the same voltage range as the battery B1; 2) an external rechargeable battery that the power pack can recharge; or 3) a power source that can be used to recharge B1 if it is completely discharged and unable to start the fuel cell system.

During normal operation a load is powered solely by the main battery B1 through a load disconnect switch S2. If the load draws more average power than the fuel cell is providing the external battery will ultimately discharge. Before it is completely discharged the control logic, which is shared between the system controller and the battery protection circuit, will open the load disconnect switch S2 so that the fuel cell power can recharge B1. The control logic operates such that protecting the battery from excessive current, overvoltage, or undervoltage takes precedence over other desired functionality.

A fault condition at the load terminals, e.g., a short or power source at higher voltage at the battery, will be detected by the protection circuit which will open switch S1, disconnecting the battery from the remainder of the circuit. This will trigger the control logic in the system controller 106 to open switch S2 as well. Both S1 and S2 are of a type that can block current in both directions when open to protect against both short circuits and excessive voltages from an external power source. The fault condition is detected by current and voltage monitors that are part of the protection circuit. The current monitor is shown explicitly here as current sense resistor R1, but the current-sense circuit may use the voltage across S1 or other methods known in the prior art. It is understood that S1, R1, and B1 need only be connected in series for the function described, but these components may be connected in an order that is different than that illustrated while remaining within the scope of the invention. The order shown here is for illustrative purposes only.

Although the load disconnect switch S2 is shown for illustrative purposes on the high side in series with the Load B+ terminal it could also be implemented on the low-side in series with the Load B1− terminal and such configuration should be understood as being part of this invention. The protection circuit may contain any of the features typically found in such components, such as battery temperature measurement or cell balancing features for multicell batteries, as will be understood by those skilled in the art.

In the illustrative embodiment, there is an internal battery 108 connected to the system controller 106 that can provide power if the battery protection switch S1 opens for any reason. The controller 106 can then communicate with the protection circuit 120 to reset S1 to the closed position—or it can attempt to charge the battery which will typically reset S1. It is noted that the internal battery will have its own protection circuit (not shown).

In accordance with another aspect of the invention, the extra internal battery can be omitted in which case the system controller switches the PWM control of the DC-DC converter from fuel cell control to output voltage control so the controller can use the power from the fuel cell to continue running and reset the battery switches to try again. If the fault persists, the fuel cell system will shutdown and the battery protection logic monitors conditions at the load terminal to determine when the fault condition has been repaired.

In practice, components on the battery side of the circuit, including the battery protection circuit 120 and load disconnect switch S2, would be packaged together with the battery and installed in the system as a unit so that the battery is protected during handling and assembly.

Figure 2:
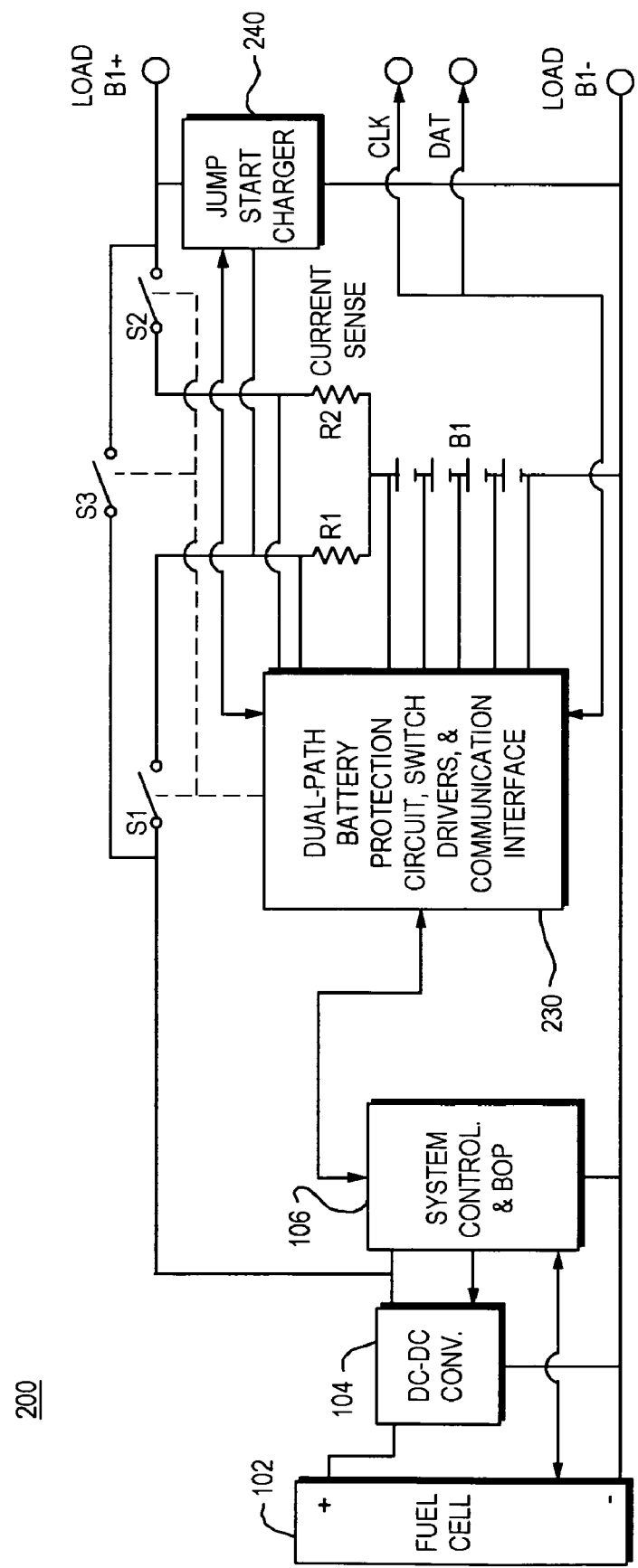
FIG. 2 is a schematic block diagram of a fuel-cell battery power pack of the present invention with a single battery output, and which includes the dual-path battery protection circuit of the present invention.

FIG. 2 is a schematic block diagram of a fuel-cell battery power pack of the present invention with a single battery output, and which includes the dual-path battery protection circuit of the present invention. FIG. 2 illustrates a power pack 200 with the same functionality as that of FIG. 1 and thus like components have the same reference characters. However, the power pack 200 includes an alternative battery protection and powerpath control circuit 230. It is a key feature of the invention that two primary paths to get current into and out of the battery are provided. Specifically one path provides current from the fuel cell 102 through switch S1, and through current sense resistor R1 to thus charge the battery B1 from the fuel cell. The second path is from the battery B1 through the current sense resistor R2 through switch S2 to the load. The protection circuit 230 monitors the current in each path separately and if limits are exceeded only the switch which is in the path of the excessive current will be opened.

This power pack 200 has two advantages over the approach shown in FIG. 1: 1) there is only one switch between the battery and the load; and 2) a fault condition at the load will not disconnect the fuel cell system from the battery. Current flowing from the battery to the load must flow only through switch S2, rather than through two switches as shown in FIG. 1, which reduces the conduction losses in the circuit during high current discharges. The current path through S1 is also monitored to protect from fault conditions that might arise within the fuel cell electronics or during handling and assembly.

A third path for current into the battery is shown as the jump-start charger 240 which is controlled by the protection logic. If the battery has been completely discharged the protection circuit 230 can wake up when an external power source is attached to the load terminals. The protection circuit 230 can ascertain the status of the battery and if necessary use the external power source to charge the battery at a safe charging rate. The jump-start charger circuit can be a simple linear charger element that accepts voltages higher than the battery voltage or a complex universal-input charger circuit that can accept a wide range of voltages and power sources such as primary batteries, voltage supplies, or a photovoltaic panel. It accordance with another aspect of this invention the universal-input charger circuit will monitor the voltage and if the power source is of limited power, such as from a solar panel, the circuit will vary the amount of current it draws until it finds the maximum power condition of the power source. Though not shown specifically in every figure herein, this jump-start circuit can be included in each embodiment of this invention.

If a fault condition occurs at the load terminals which causes too much current to flow in or out of the battery, the protection circuit will open switches S2 and S3, but leave S1 closed so that the fuel cell can continue charging the battery while the fault condition is fixed by the user. Thus, no internal battery or extra circuitry is needed to recover from the fault condition or safely shut down the fuel cell if it is not addressed by the user. If it is desired that the fuel cell charge an external rechargeable battery attached to the Load pins while being unconnected from the battery B1 then switch S3 is closed while switches S1 and S2 are open. Switches S1, S2, and S3 are all of a type that can block current in both directions when open.

It is understood that an alternative embodiment of this invention uses the resistances across the switches S1 and S2 as the current sense resistors to reduce conduction losses at the expense of accuracy of the current measurements. Another embodiment is to place all of the switches on the low side (in series with the Load B1− terminal).

Figure 3:
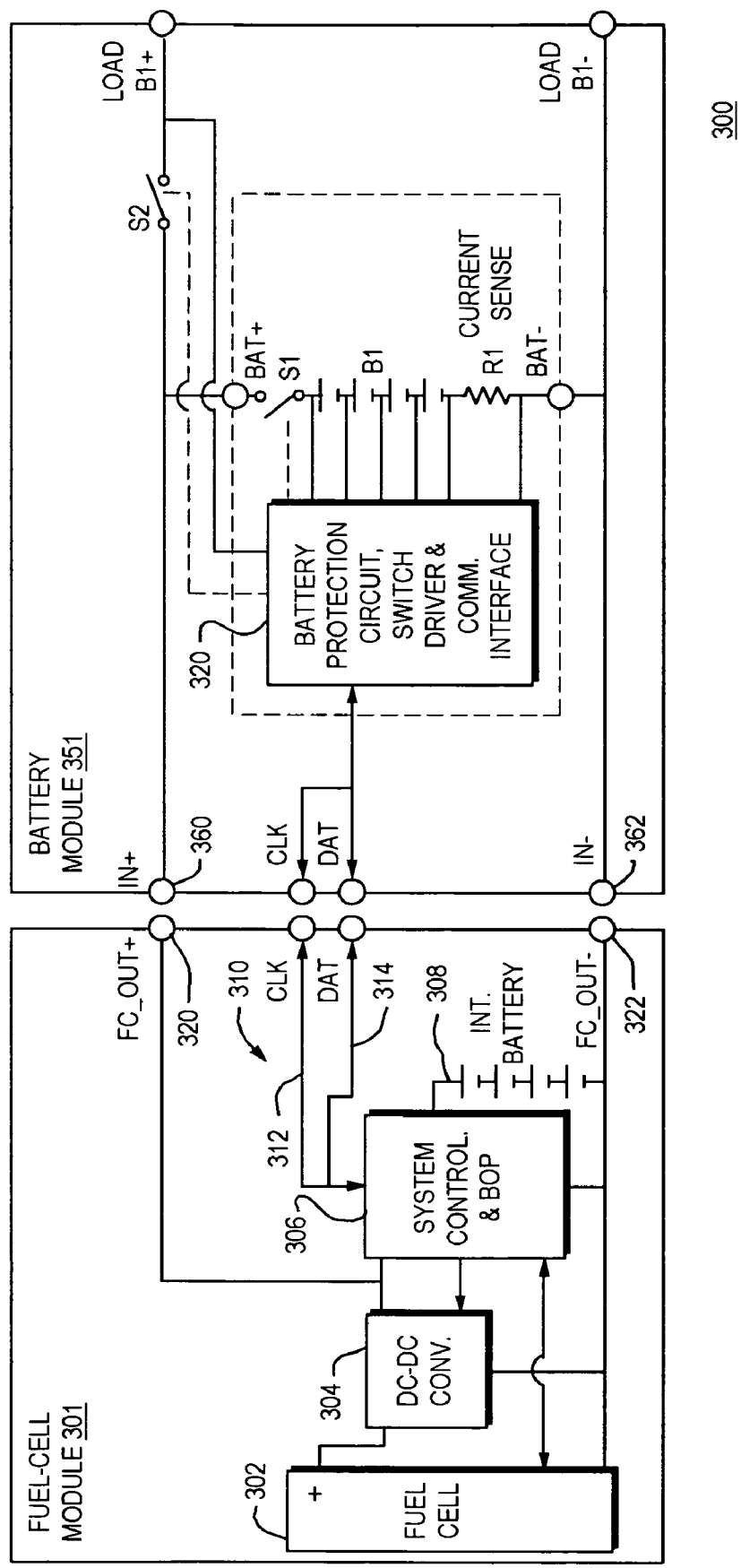
FIG. 3 depicts an illustrative modular embodiment of the system of FIG. 1 with an internal battery in the fuel-cell module to allow safe shutdown if the battery module is disconnected from the fuel cell while in use.

FIG. 3 depicts an illustrative modular embodiment of the system of FIG. 1 with an internal battery in the fuel-cell module to allow safe shutdown if the battery module is disconnected from the fuel cell while in use. More specifically, FIG. 3 illustrates a power pack 300 which is a modular version of the system in FIG. 1 in which the fuel-cell and the main battery are separated into two modules, a fuel cell module 301 and a battery module 351. The fuel cell module 301 includes a fuel cell 302, DC-DC converter 304 and a system controller and balance of plant 306, which is powered either by an internal battery 308 or the external battery Bi when it is connected. With the modules 301 and 351 connected, the power pack 300 has the same functionality as the system of FIG. 1. If the battery module 351 is disconnected from the fuel-cell module 301, the internal battery 308 of the fuel cell module provides power for a safe and orderly shutdown of the fuel cell system.

The communication link 310 is shown as a two-wire communication link (CLK 312 and DAT 314) but could use a single wire or have more wires. The communication link 310 not only allows the system controller 306 to control the switches S1 and S2 on and off during non-fault conditions, but it also allows the charging algorithms in the system controller to be modified if different types of batteries are attached, making it a smart battery and smart charger system.

The fuel cell module 301 is coupled to the battery module 351 at FC_out+ terminal 320 which is connected to Battery In+ terminal 360, and at FC_Out− terminal 322 being connected to Battery In− terminal 362. The battery module includes a battery protection circuit 320 which has its own current sense and resistor R1 and internal protection switch S1.

Figure 4:
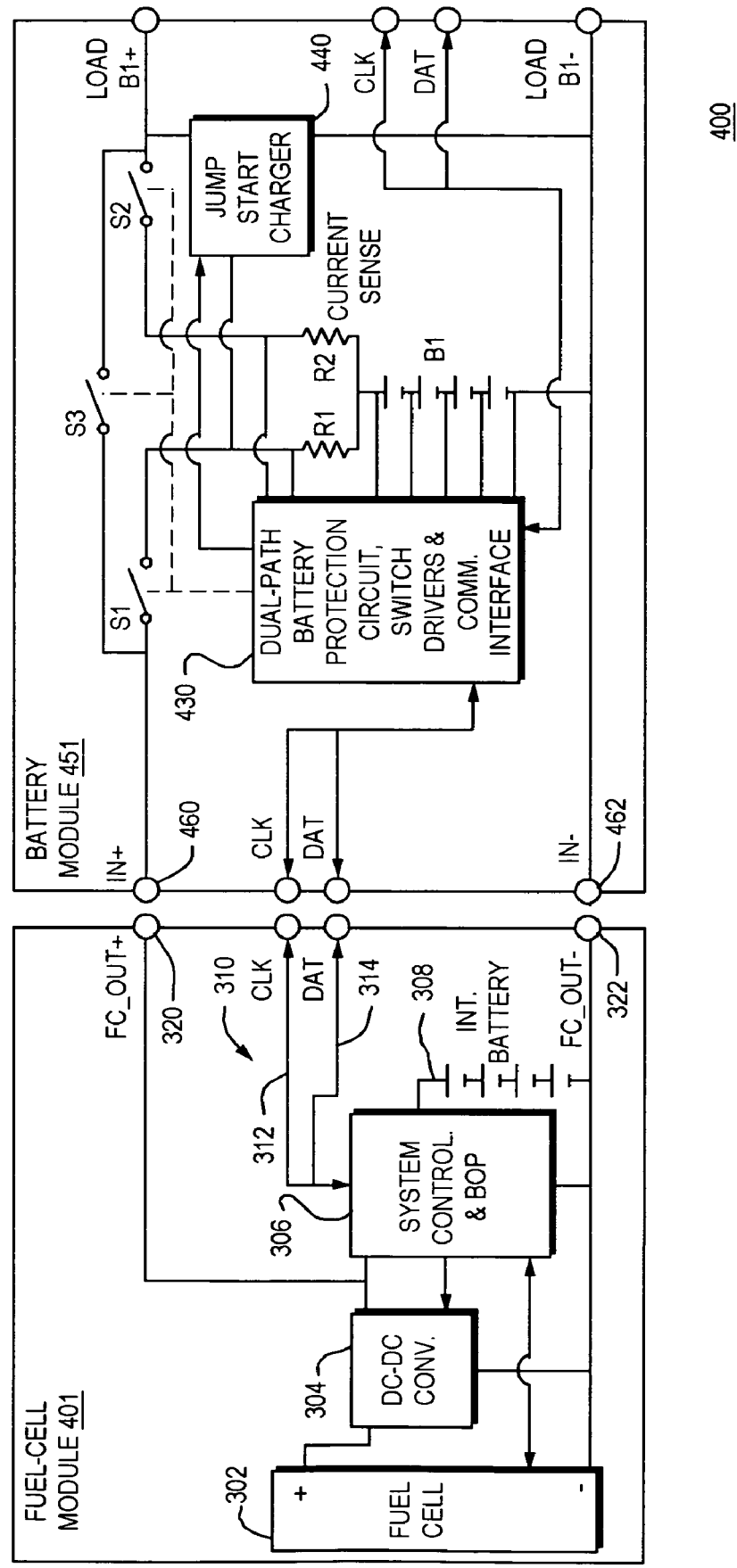
FIG. 4 depicts an illustrative modular embodiment of the system of FIG. 2 with an internal battery in the fuel cell module similar to FIG. 3.

FIG. 4 depicts an illustrative modular embodiment of the system of FIG. 2, with an internal battery in the fuel cell module similar to FIG. 3. Specifically, FIG. 4 illustrates a modular power pack 400 which is a modular version of the system in FIG. 2 in which the fuel cell and the main battery are separated into two modules, which are fuel cell module 401 and battery module 451. With the modules connected, it has the same functionality as the system of FIG. 2. The fuel-cell module 401 is the same as that in FIG. 3, and thus like components have the same reference characters as in FIG. 3. The fuel cell module 401 has an internal battery 308 to provide for a safe and orderly shutdown of the fuel cell system if the battery module 451 is disconnected while running.

The battery module 451 includes the main battery B1 which is protected by the dual path battery protection circuit 430 of the present invention. Thus, there are two primary paths to get current into and out of the battery. One path provides current from the fuel cell 302 through switch S1, and through current sense resistor R1 to thus charge the battery B1 from the fuel cell. The second path is from the battery B1 through the current sense resistor R2 through switch S2 to the load. The protection circuit 430 monitors the current in each path separately and if limits are exceeded only the switch which is in the path of the excessive current will be opened. Bypass switch S3 can be used when the fuel cell 302 is providing power directly to the load or to charge an additional external rechargeable battery.

FIGS. 5-10 illustrate several embodiments of the invention to provide two isolated battery outputs from one unit that are kept charged by one or more fuel cells. Because the two battery outputs are isolated, they can be connected externally by the user as needed, e.g., in series, parallel, or kept isolated.

Figure 5:
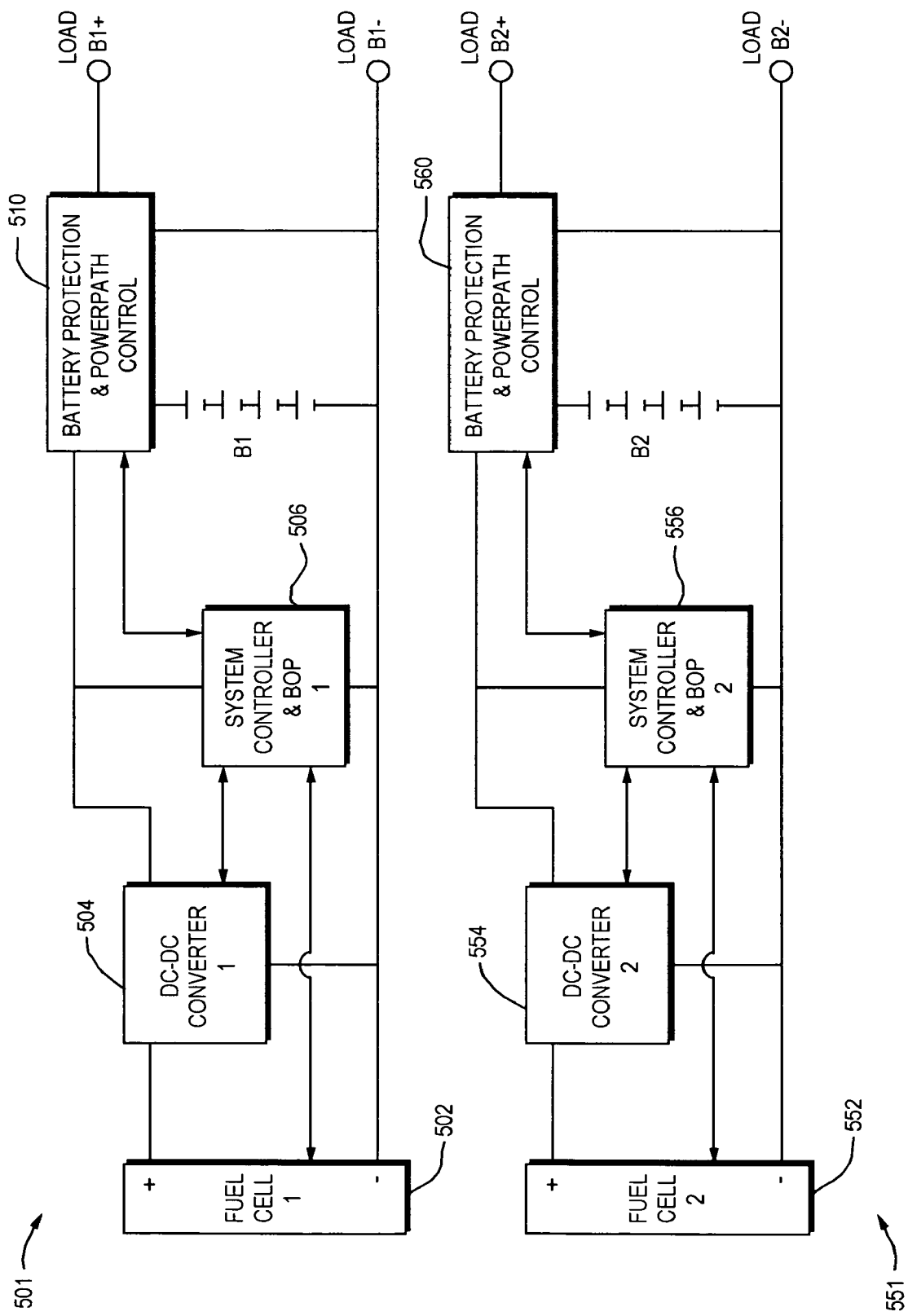
FIG. 5 is a schematic block diagram of a fuel-cell battery power pack in accordance with the present invention with two isolated battery outputs comprised of two independent single battery systems of the type shown in FIGS. 1 & 2.

FIG. 5 is a schematic block diagram of a fuel-cell battery power pack in accordance with the present invention with two isolated battery outputs comprised of two independent single battery systems of the type shown in FIGS. 1 & 2. The first embodiment 500 of the invention for two isolated battery outputs is illustrated in FIG. 5 and is comprised of two independent single battery systems 501, 551 of the type shown in FIGS. 1 and 2. Each battery system includes its own respective fuel cell 502, 552, and its own DC-DC converter 504, 554, as well as a system controller and balance of plant block 506, 556. It is noted that the battery protection and powerpath control blocks 510, 560 can be that of FIG. 1 or that of FIG. 2. This embodiment 500 is has an extra overhead of two system controllers and balance of plant blocks 506, 556 which consume additional volume that could be used for fuel, and because the two fuel cells would be half the size of a single fuel cell and if the user draws power from only one of the two batteries only half of the available fuel cell power can be used to recharge it. However, there may be practical applications in which the embodiment of FIG. 5 is desirable.

Figure 6:
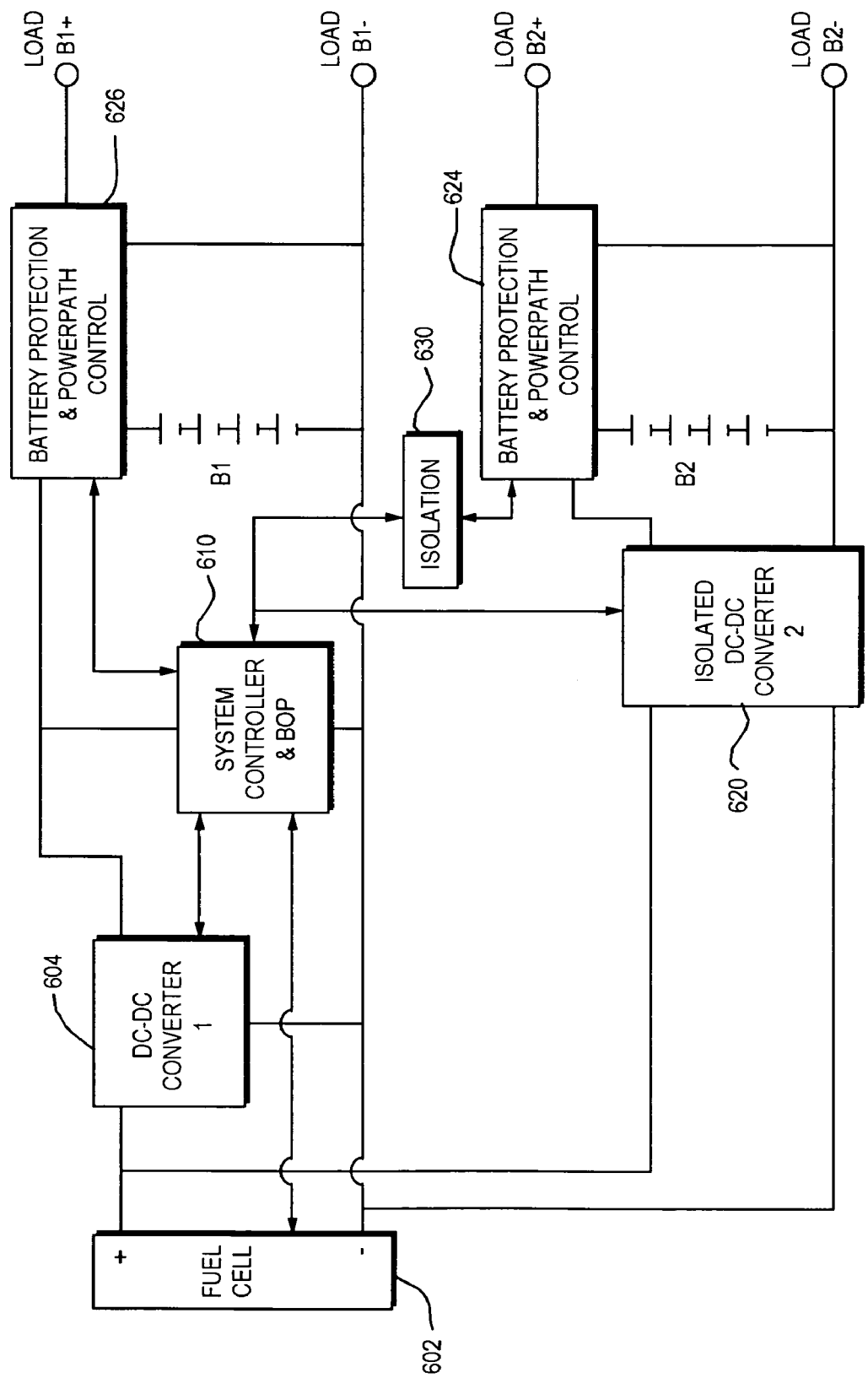
FIG. 6 is an illustrative embodiment of the present invention in which a fuel-cell battery power pack with two isolated battery outputs is powered from a single fuel cell, and the fuel cell is used to charge the two isolated batteries, and in which one of the batteries is charged through a DC-DC converter similar to that of FIGS. 1 and 2, and the second battery is charged through a second isolated DC-DC converter that is powered directly from the fuel cell.
Figure 7:
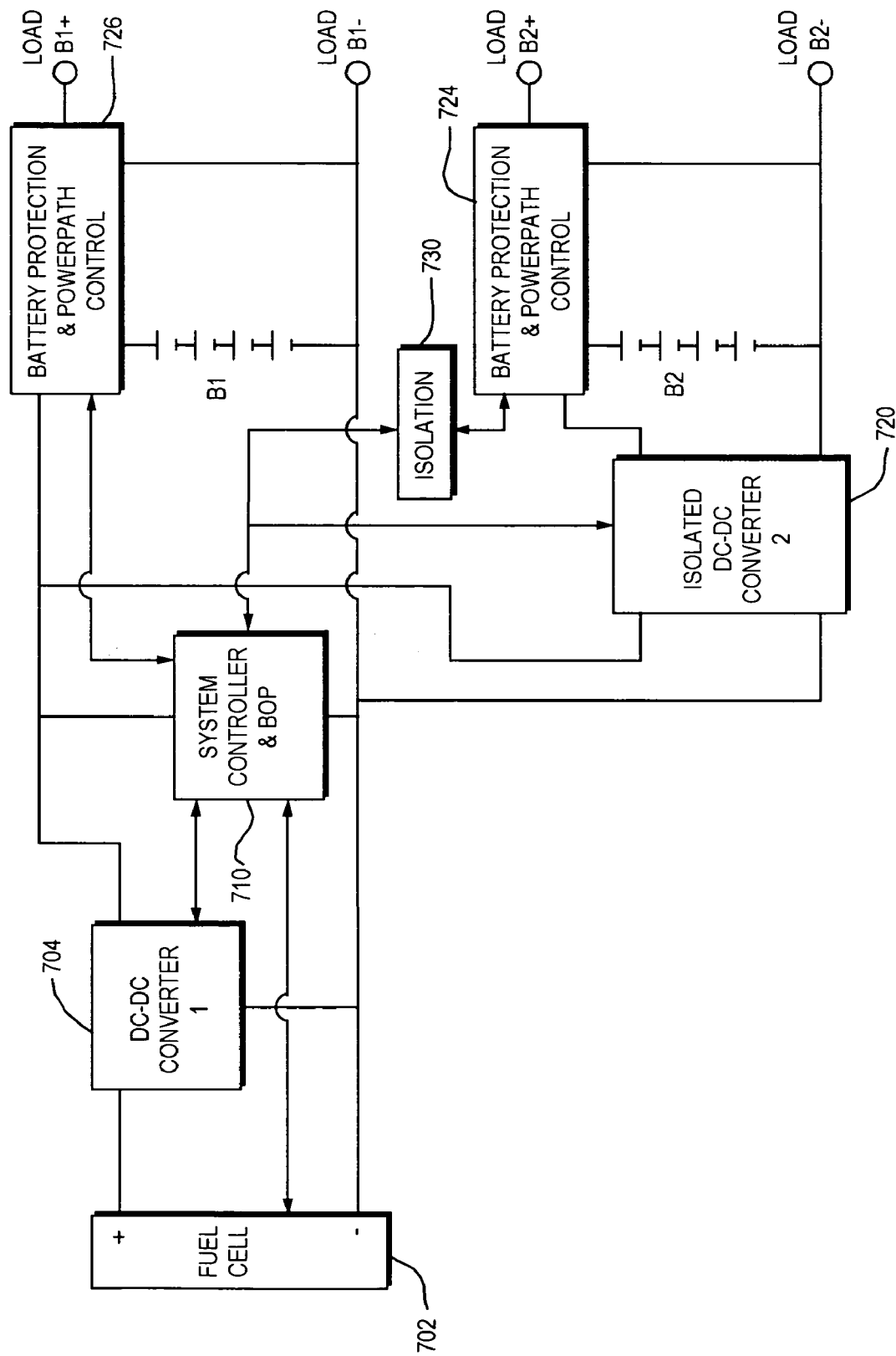
FIG. 7 is an illustrative embodiment of the present invention with two isolated battery outputs similar to FIG. 6 in which the second isolated DC-DC converter charging the second battery is powered by the first battery which is also connected to the output of the first DC-DC converter.
Figure 8:
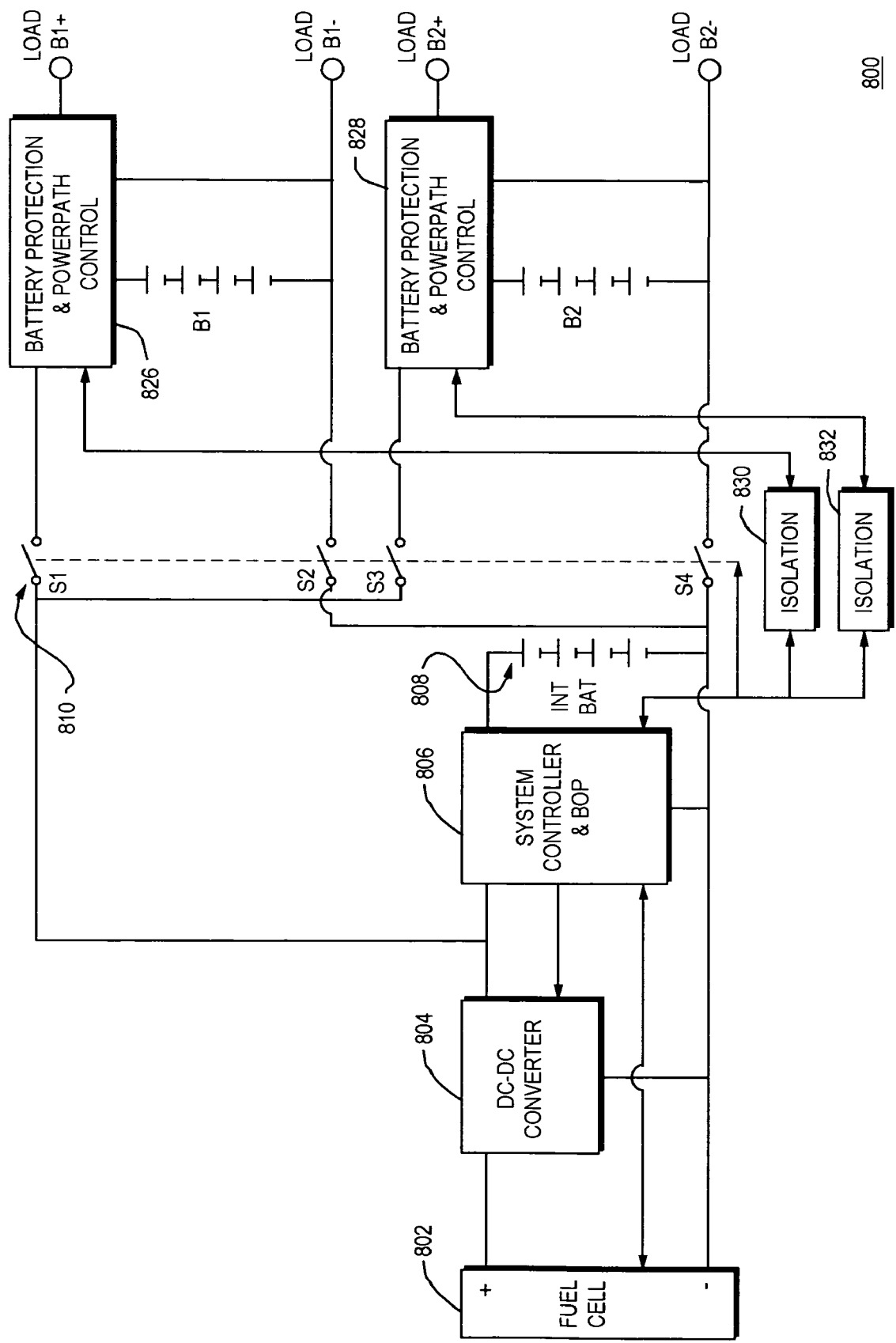
FIG. 8 illustrates another embodiment of the invention with two isolated battery outputs which is a power pack having a single fuel cell, a single DC-DC converter and a switch network to connect the output of the single DC-DC converter to either of the isolated batteries and isolated communication links between the system controller and the battery protection logic to control the switches, in which the switch drivers for S1-S4 are powered from the fuel cell side.
Figure 9:
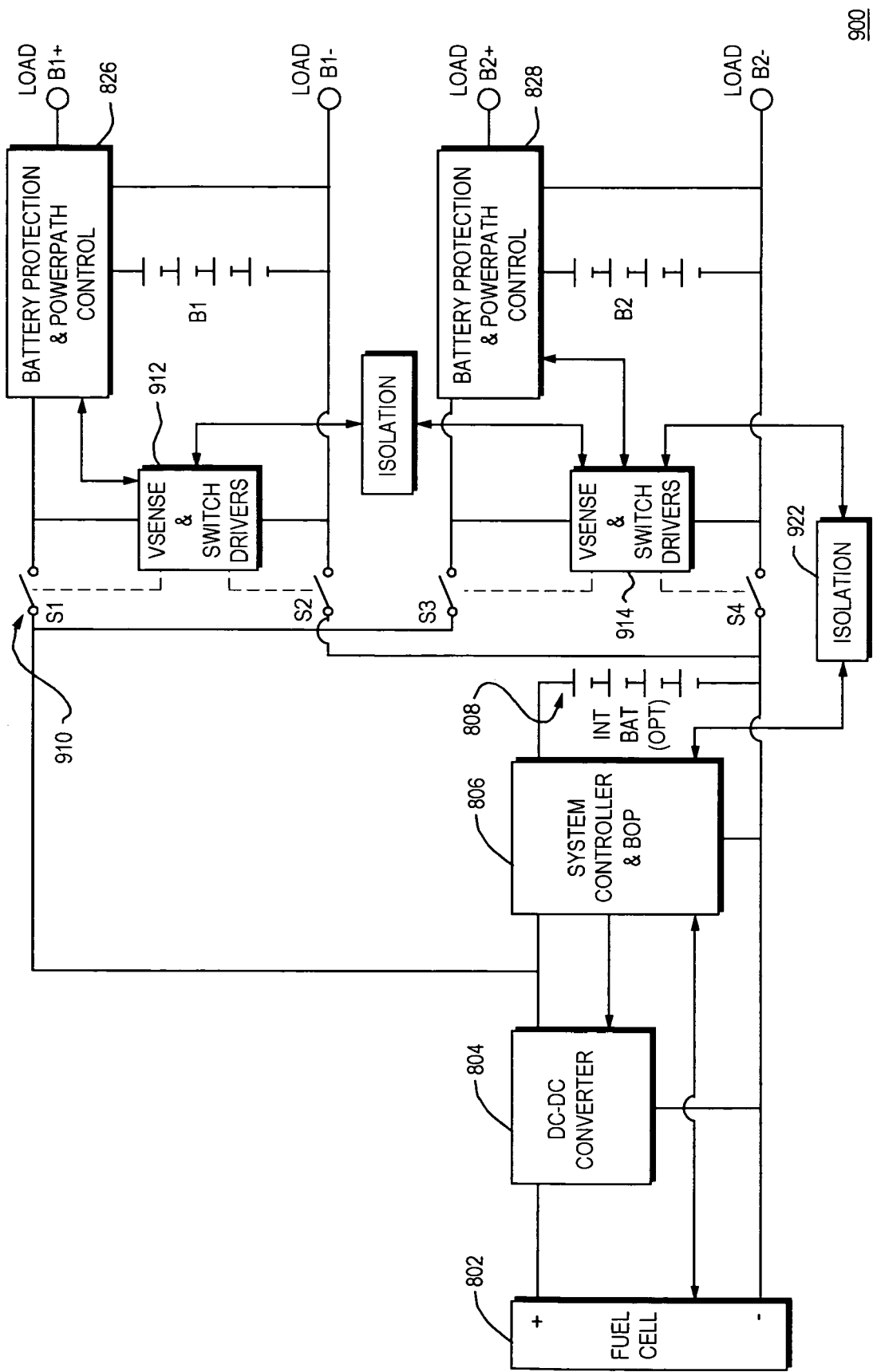
FIG. 9 illustrates an embodiment of the power pack of the present invention with two isolated battery outputs with a switch network and isolated communications similar to that of FIG. 8 but with the switch drivers powered from each of the batteries, B1 and B2, respectively.
Figure 10:
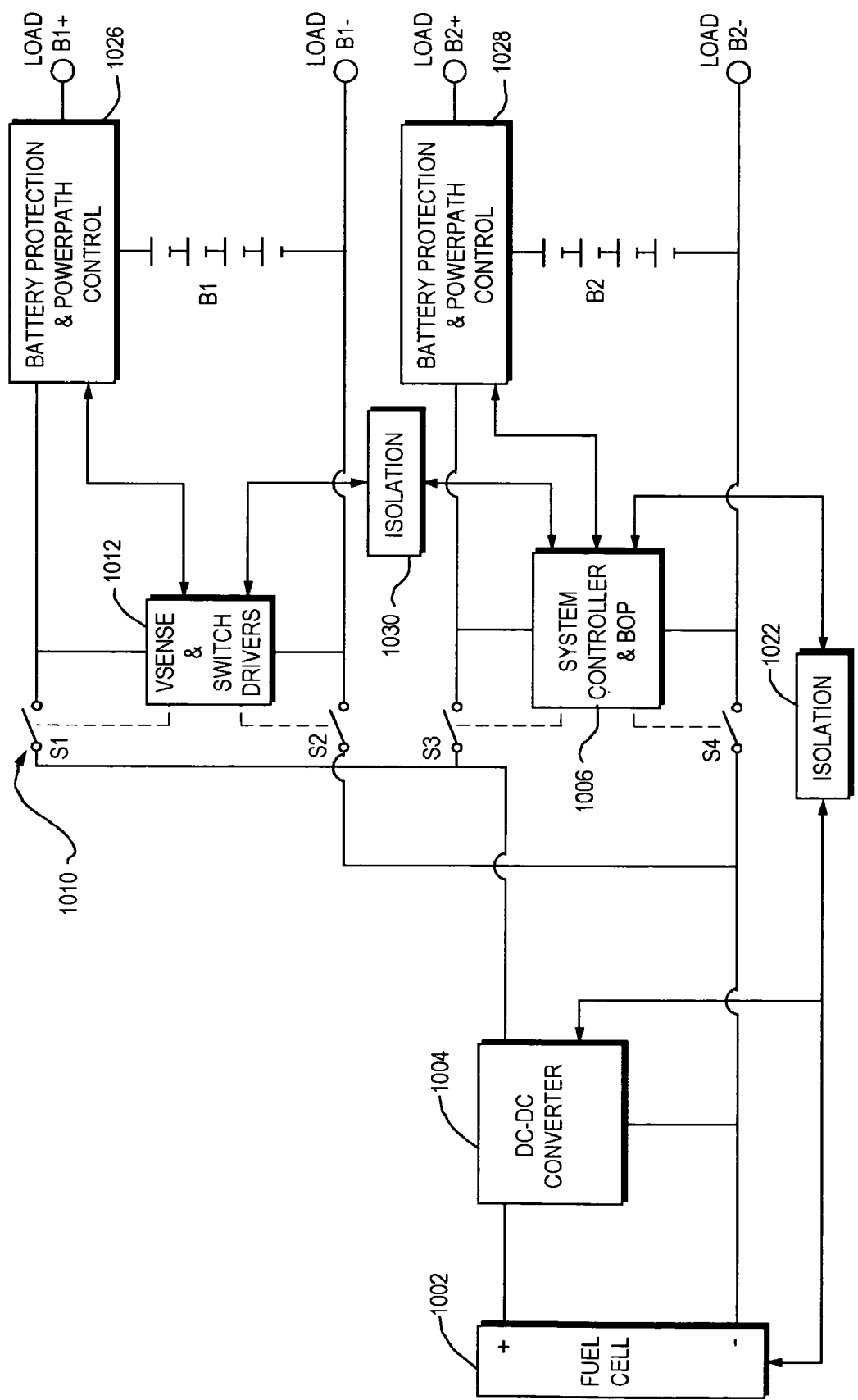
FIG. 10 illustrates an alternative embodiment of the powerpack of the present invention with two isolated battery outputs and isolated communications similar to that shown in FIGS. 8 & 9 with the system controller and balance of plant block powered directly from the battery B2.

FIGS. 6-10 illustrate embodiments of this invention in which a single fuel cell is used to charge two isolated batteries. There are two general approaches described with respect to this aspect of the invention: 1) use of an isolated DC-DC converter to charge the second battery as illustrated in FIGS. 6 & 7; and 2) use of a switch network to switch the output of the single fuel cell to one of the two batteries as illustrated in FIGS. 8-10. The control logic in all embodiments operates to keep the state of charge of the two batteries equal to each other at all times. For example, if the load draws more average power than the fuel cell can make, by keeping the batteries at the same state of charge they will be discharged together rather than one battery being discharged before the other which will maximize the time the system can be run in such a mode. If all of the current is being drawn from a single battery, it will be the battery that gets all of the fuel cell power to recharge it.

FIG. 6 is an illustrative embodiment of the present invention of a fuel-cell battery power pack with two isolated battery outputs in which power from a single fuel cell is used to charge the two isolated batteries, and in which one of the batteries is charged through a DC-DC converter similar to that of FIGS. 1 and 2, and the second battery is charged through a second isolated DC-DC converter that is powered directly from the fuel cell. FIG. 6 illustrates an embodiment of a power pack 600 in which power from a single fuel cell 602 is used to charge the two batteries B1 and B2. The portion of the system that charges B1 is identical to that shown in FIGS. 1 or 2 with DC-DC converter 604 used to charge B1, and a battery protection circuit and powerpath control circuit 626 may be either circuit for protecting the battery B1 as in FIGS. 1 and 2 The output voltage of the fuel cell 602 is also provided to a second DC-DC converter, which in this embodiment is an isolated DC-DC converter 620 (e.g., a transformer-based DC-DC converter), which in turn provides its output voltage to a second battery protection and power path control circuit 624 which protects battery B2 as it is being charged. The battery protection and powerpath control circuit for battery B2 can be like that of FIG. 1 or 2.

A system controller and balance of plant assembly block 610 is used to control the power pack 600. More specifically, the system controller monitors the state of charge of each battery, e.g. the voltage or information from a coulomb counting circuit (battery gas gauging), and sends more current to the battery (B1 or B2) which is at the lowest state of charge. The system controller can either run both DC-DC converters simultaneously, with DC-DC converter 604 operated under fuel-cell control and DC-DC converter 620 operated under current control (or vice versa) or it can select that only one of the converters should be operated at a time in which case the converter that is operating will operate under fuel cell control.

In this embodiment of the invention, the system controller 610 communicates with the battery protection and powerpath control circuit 624 through an isolated communication interface 630. The digital isolation circuit may use any of the common isolations methods, such as optical, magnetic, or capacitive, that are known to those skilled in the art. Notably, in this embodiment of the power pack 600, just one fuel cell is needed to provide the power to charge the batteries B1 and B2.

FIG. 7 is an illustrative embodiment of the present invention with two isolated battery outputs similar to FIG. 6 in which the second isolated DC-DC converter charging the second battery is powered by the first battery which is also connected to the output of the first DC-DC converter 704. Specifically power pack 700 includes a single fuel cell 702 which is used to charge batteries B1 and B2. A first stage of the power pack 700 is used to recharge battery B1. In that portion of the power pack 700, the output of the fuel cell 702 is provided to DC-DC converter 704 and in turn to a first battery protection and power path control circuit 726. This is used to recharge battery B1 similar to the systems shown in FIGS. 1 & 2. A system controller and balance of plant block 710 is used to control the charging of the batteries and to maintain appropriate operation of fuel cell 702. With respect to the second stage, an isolated DC-DC converter 720 is coupled to battery B2 to provide its current, but this isolated DC-DC converter 720 is itself powered by the battery B1, in this embodiment instead of by the fuel cell 702. The DC-DC converter 720 should have a slightly higher efficiency in this embodiment than in the embodiment of FIG. 6, however, the power from the fuel cell has already been reduced due to the <100% efficiency of DC-DC converter 704, prior to going through DC-DC converter 720 so the power pack 700 may overall be somewhat less efficient than the embodiment of FIG. 6, but may be desirable in a particular application of the invention.

FIG. 8 illustrates another embodiment of the invention with two isolated battery outputs which is a power pack having a single fuel cell, a single DC-DC converter and a switch network to connect the output of the single DC-DC converter to either of the isolated batteries and isolated communication links between the system controller and the battery protection logic to control the switches, in which the switch drivers for S1-S4 are powered from the fuel cell side.

As shown in FIG. 8, power pack 800 has fuel cell 802 and a single DC-DC converter 804, and system controller and balance of plant block 806, powered by internal battery 808. The single DC-DC converter 804 is coupled with a switch network 810. The switch network 810 connects the fuel-cell-powered charger to either battery B1 or battery B2. More specifically, when switches S1 and S2 are closed the fuel cell power is directed to battery B1. When switches S3 and S4 are closed the fuel cell power is directed to battery B2. The control logic, which is shared between the system controller 806 and the protection circuits 826, 828, ensures that only one battery is connected at a time. A further part of the invention is an isolated communication link 830, 832 between the system. controller 806 and the two protection circuits 826, 828, respectively, which allow the system controller 806 to turn the switches S1-S4 of the battery protection and powerpath control circuits on and off during non-fault conditions.

Switch network 810 is shown as powered on the control side. The switches S1 through S4 may be for example, optically-isolated solid-state relays, electromagnetic (EM) relays or MOSFETs with transformer-coupled gate drives. A lower power latching relay may be used in particular applications of the invention. The embodiment of FIG. 8 has greater efficiency than the power packs 600 and 700 of FIGS. 6 and 7, respectively because the isolated DC-DC converters using transformers are not as efficient as the inductor-based non-isolated DC-DC converter used here. However, there may be applications in which the transformer based DC-DC converters are desirable despite the cost in efficiency. The system controller and balance of plant components are illustrated as a box 806 for the sake of clarity of illustration. In this embodiment, the system controller and balance of plant block 806 is powered by its own internal battery 808 in order to have power to drive the switches.

FIG. 9 illustrates an embodiment of the power pack with two isolated battery outputs with a switch network and isolated communications similar to that of FIG. 8 but with the switch drivers powered from each of the batteries, B1 and B2, respectively. More specifically, FIG. 9 illustrates an embodiment of the power pack 900 of the present invention in which like components have the same reference numerals as in FIG. 8. The switch network 910 includes switch drivers 912 and 914 which are powered from each of the batteries, B1 and B2, respectively. In this embodiment the switches S1-S4 may be back to back MOSFETs (that block current flow in both directions) and are used with the switch drivers 912 and 914 in such manner that substantially no power is required as compared to the types of switches that are described with respect to the embodiment of FIG. 8. An isolated communication link 922 allows the system controller and the circuitry on the battery side to communicate so that the system controller gets battery status information and it can also control the switches during non-fault conditions.

In one embodiment there is an internal battery 808 on the fuel cell side of the switch network 910 that ensures that the system controller has power and can control which set of switches, if any, are to be closed. In a preferred embodiment this internal battery can be eliminated by designating one of the switch drivers 912, 914 upon initial configuration as the MASTER that communicates with the other switch driver to ensure that only one set of switches is closed. The fuel cell is used to recharge only one battery at a time. It is noted, however, that one battery can be supplying power to a load while the other battery is being recharged.

Figure 11:
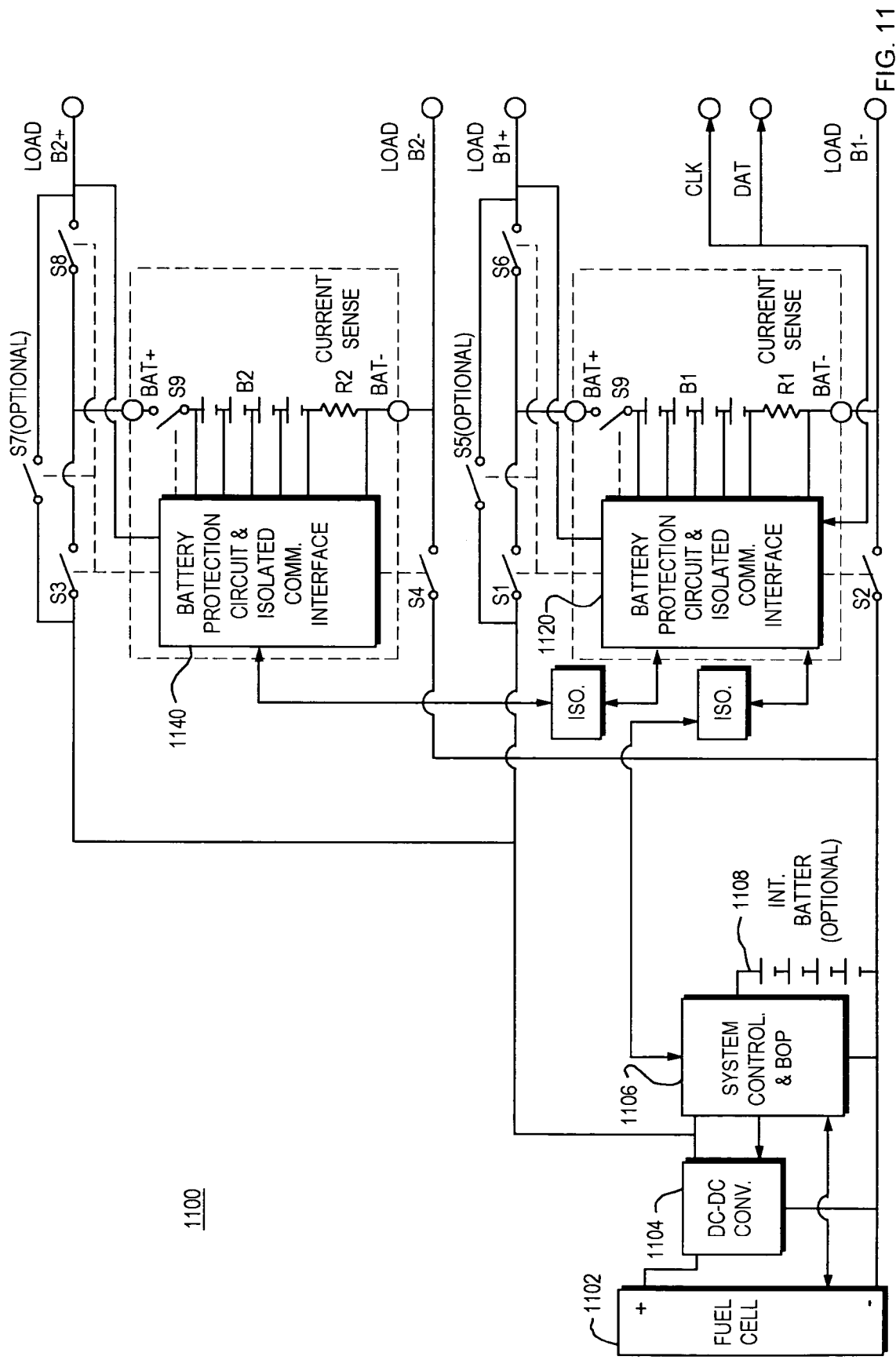
FIG. 11 illustrates in greater detail the embodiment of FIG. 9 where the battery protection and powerpath control circuit makes use of a battery protection circuit modified to allow the system controller to turn the switches on and off during non-fault conditions.
Figure 12:
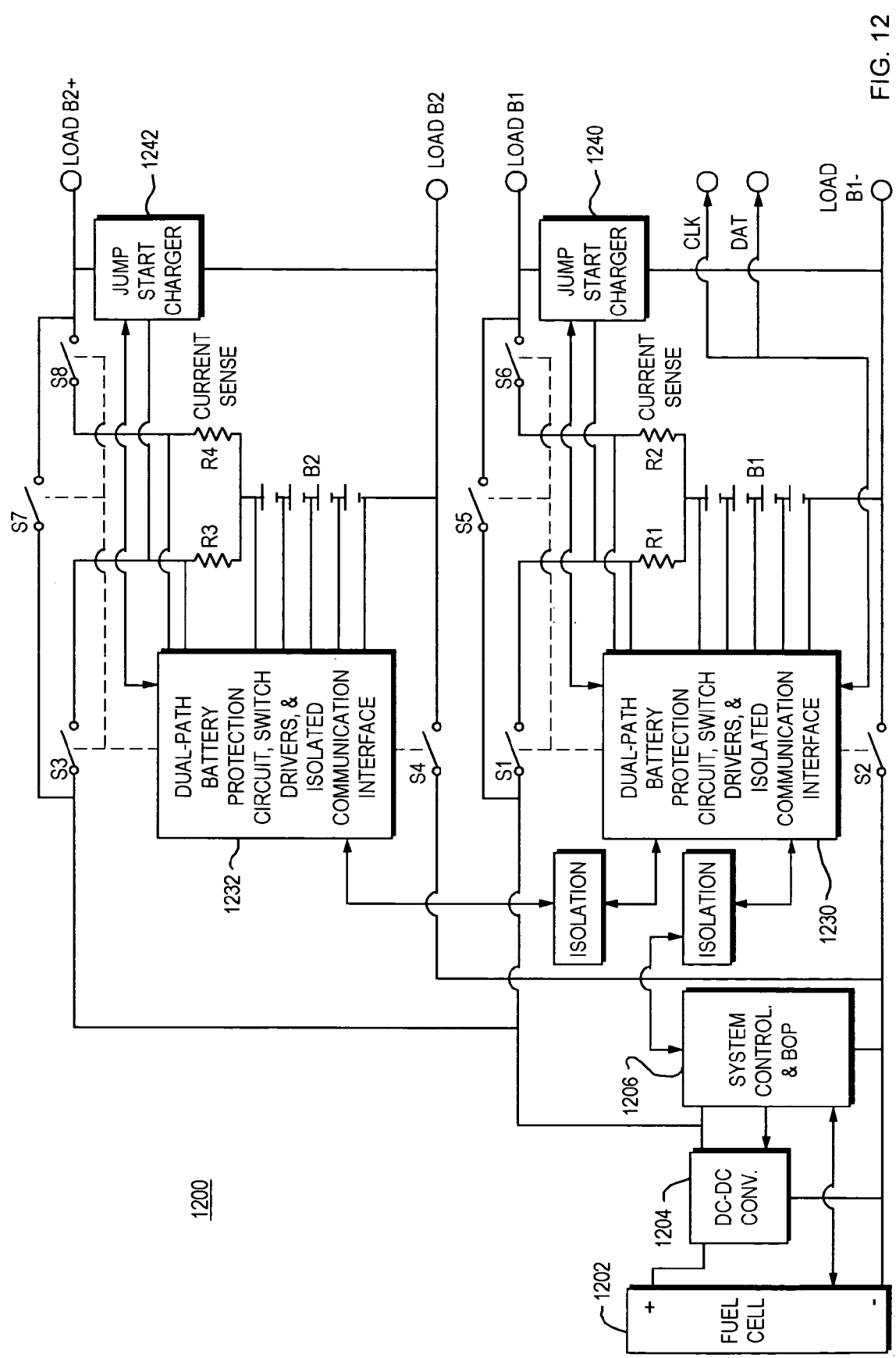
FIG. 12 illustrates in greater detail the embodiment of FIG. 9 where the battery protection and powerpath control circuit is the dual-path battery protection circuit of the present invention, and in which a charging circuit is provided that can charge each battery from the load terminals if the internal battery is discharged and an external power source is connected to the load terminals.

It is noted that switches S1 and S3 of power pack 900 may be included in the battery protection and powerpath control circuit as shown in detail in FIGS. 11 & 12. They are shown separately here for illustration purposes.

The power pack 1000 of FIG. 10 uses a single fuel cell 1002 and a single DC-DC converter 1004 with the switch network 1010 and is a variation on the embodiments shown in FIGS. 8 & 9 in which the system controller and balance of plant block 1006 is disposed on the battery side of the switch network 1010 and specifically connected to the battery B2. Battery B1 has Vsense and switch driver 1012 and battery protection and powerpath control circuit 1026, and battery B2 has battery protection and powerpath control circuit 1028. The system controller and balance of plant block 1006 communicates through isolation communications interface 1030 with the Vsense and switch driver 1012.

The common features of the embodiments of FIGS. 8-10 are a single fuel cell, a single DC-DC converter, a switch network, two isolated batteries with battery protection and powerpath control circuits, and isolated communication links between the system controller and the battery protection circuits and associated switch drivers. It is understood that any combination of these elements that achieve the same functionality is envisioned as within the scope of the present invention.

FIG. 11 illustrates in greater detail the embodiment of FIG. 9 where the battery protection and powerpath control circuit makes use of a battery protection circuit modified to allow the system controller to turn the switches on and off during non-fault conditions. More specifically, the power pack 1100 of FIG. 11 includes a fuel cell 1102, a DC-DC converter 1104, a system controller and balance of plant block 1106, powered by either an optional internal battery 1108 or one of the batteries B1 or B2. The first battery B1 is protected by a battery protection circuit 1120, as modified in accordance with the invention such that the system controller can control the switches in non-fault situations and retrieve battery status information; the protection circuit has its own current sense resistor R1 and switch S9. Battery B2 has its own battery protection circuit 1140 which includes the current sense resistor R2 and the switch S9. The battery can be recharged and the current delivered to the load by setting the switches in the manner described with reference to FIG. 9.

As noted, FIG. 11 illustrates the embodiment of FIG. 9 in greater detail, specifically showing one embodiment of the battery protection and powerpath control circuit integrated with the switch network. The protection circuits for B1 and B2 are similar to the protection circuit of FIG. 1 described above except that the switches that are part of the switch network that corrects to the fuel cell (S1-S4) are now incorporated with the drivers of all switches powered by their respective batteries. An alternative embodiment of this invention would have switches S7 (S5) and S8 (S6) moved to the low side with S8 (S6) in line with the Load B2− (Load B1−) terminal.

FIG. 12 illustrates in greater detail the embodiment of FIG. 9 where the battery protection and powerpath control circuit is the dual-path battery protection circuit of the present invention, and in which a charging circuit is provided that can charge each battery from the load terminals if the internal battery is discharged and an external power source is connected to the load terminals;

FIG. 12 illustrates power pack 1200, which is similar to the embodiment of FIG. 9 and, in detail similar to FIG. 11, having fuel cell 1202, DC-DC converter 1204 and system controller and balance of plant block 1206. However, in the power pack 1200 the alternative dual-path protection scheme of the present invention is shown. The protection circuits 1230, 1232, for B1 and B2, respectively are similar to the protection circuit of FIG. 2 described above except that the switches that are part of the switch network that connects to the fuel cell (S1-S4) are now incorporated with the drivers of all switches powered by their respective batteries. An alternative embodiment of this invention would have switches S7 (S5) and S8 (S6) moved to the low side with S8 (S6) in line with the Load B2− (Load B1−) terminal. This embodiment has advantages over the embodiment of FIG. 11 because there is only one switch in the current path between the battery and the load, and because a fault on the load terminals will cause switches S7 and S8 to open to protect the battery but leave S3 and S4 closed to allow the fuel cell to continue charging while the fault is rectified by the user.

In the various embodiments of the invention, a number of different types of switches can be used in the protection circuits and switch networks of the present invention, depending upon the particular application of the invention. For example, back to back MOSFETs that can block current in both directions when off can be used. N-channel devices have better characteristics and can be driven simply on the low side. MOSFETs on the high side can be P-channel or N-channel with drivers that make a higher voltage than the battery. An example is a switched capacitor charge pump converter known to those skilled in the art.

As mentioned earlier, it is possible for the fuel cell power pack of this invention to charge an external rechargeable battery connected to the load terminals. It is envisioned that rechargeable batteries of any chemistry, different numbers of cells, and varying ampacity can be charged by making use of an external communication interface to batteries equipped with the same interface. This communication interface is illustrated as the CLK and DAT lines on FIGS. 11-14. Thus information such as battery type, charge termination voltage, max charging current, charge termination current, etc, can be communicated to the charging logic of the power pack to ensure that the proper charging protocols are used. Such smart battery/charger systems are known in the prior art.

Figure 13:
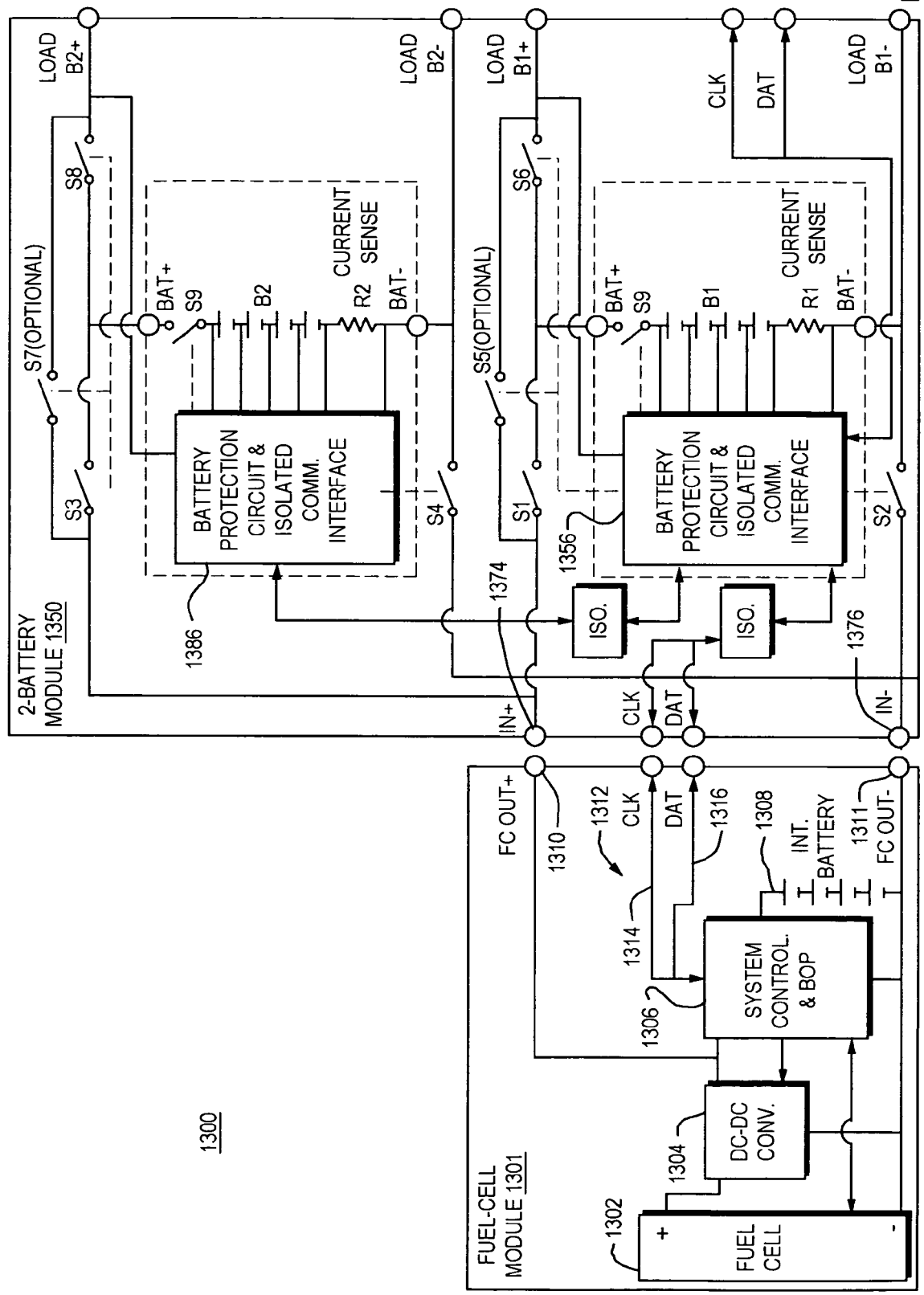
FIG. 13 illustrates a modular embodiment of the system of FIG. 1I1 with an internal battery in the fuel-cell module to allow safe shutdown if the battery module is disconnected from the fuel cell while in use.

FIG. 13 illustrates a modular embodiment of the system of FIG. 11 with an internal battery in the fuel-cell module to allow safe shutdown if the battery module is disconnected from the fuel cell while in use. Specifically, the fuel cell module 1301 provides power to recharge the batteries B1 and B2 in the battery module 1350. The fuel cell module 1301 includes a fuel cell 1302, which provides power to a DC-DC converter 1304. The module 1301 also includes a system controller and balance of plant block 1306 which operates in a manner similar to that described herein. Battery 1308 is large enough to provide start up power from a frozen state if the batteries in module 1350 are dead.

The fuel cell module 1301 is also provided with a communication interface 1312 which has a clock line 1314 and a data line 1316. Alternative communication protocols using a single wire or more wires may also be used. The fuel cell module 1301 is coupled to the battery module 1350 at FC_out+ terminal 1310 which is coupled to battery In+ terminal 1374, and at FC_Out_terminal 1311 coupled to battery In− terminal 1376.

The battery module 1350 contains batteries B1 and B2 each with its own battery protection circuit 1356 and 1386, respectively. With respect to battery B1, the battery protection circuit 1356, which includes is own internal protection switch S9 located on the high side of the battery and its own internal current sense resistor R1, which is coupled on the low side of the battery B1, but which has been modified in accordance with the invention so that the system controller 1306 can control its switches in non-fault conditions. The battery protection circuit monitors the voltage and current of the battery and disconnects the battery if the current exceeds the charge or discharge limits for that particular battery, or if the battery is overvoltaged.

Multicell protection circuits can be used to monitor the voltage on each individual cell of a multicell battery and may have the ability to perform charge balancing among the cells. Protection circuits, such as the circuit 1356, may also have one or more components for measuring battery temperature, which disconnects the battery if the temperature is outside of a predetermined range. The switch S9 and the current sense resistor R1 may be located in any manner in series with the battery string to provide the same functionality. In addition, the switch S9 may itself act as the current sense resistance which reduces the conduction losses at the expense of accuracy in the current measurement. The configuration illustrated in FIG. 13 is one illustrative embodiment, but the components shown may be configured differently and additional components may be included while remaining within the scope of the present invention.

To achieve the functionality and methods as described herein in accordance with the present invention, several switches external to the battery are provided. More specifically, S1 and S2 are placed on the high and low terminals of the load in parallel with the DC-DC converter. Switch S5 is an optional bypass switch and switch S6 controls current from the battery to the load. As noted, switch S9 is already included in the battery protection circuit.

In operation, to power a load with B1, both switch S9 and switch S6 must be closed. To charge B1 with the fuel cell power both S1 and S2 must be closed. When charging B1 and having B1 power the load an extra switch S5 can be used to reduce the conduction losses for charging current going directly to the load (which happens when the load current is larger than the charging current). If an external battery is attached to the load it can be charged directly by closing bypass switch S5 and S2, with S9 being opened. Or, S1 and S6 could be opened in that case of charging the external battery.

It is noted that a short circuit on the load connection (or other fault on the load connections happens), the protection circuit will open S9 (and S6 and S5) automatically, which disconnects power from the system controller and balance of plant 1306, as well as not providing a repository for fuel cell power. In this case, the system controller 1304 will get its power from the internal battery 1308 and it can reconnect appropriate switches in an orderly many to determine if the fault persists.

Figure 14:
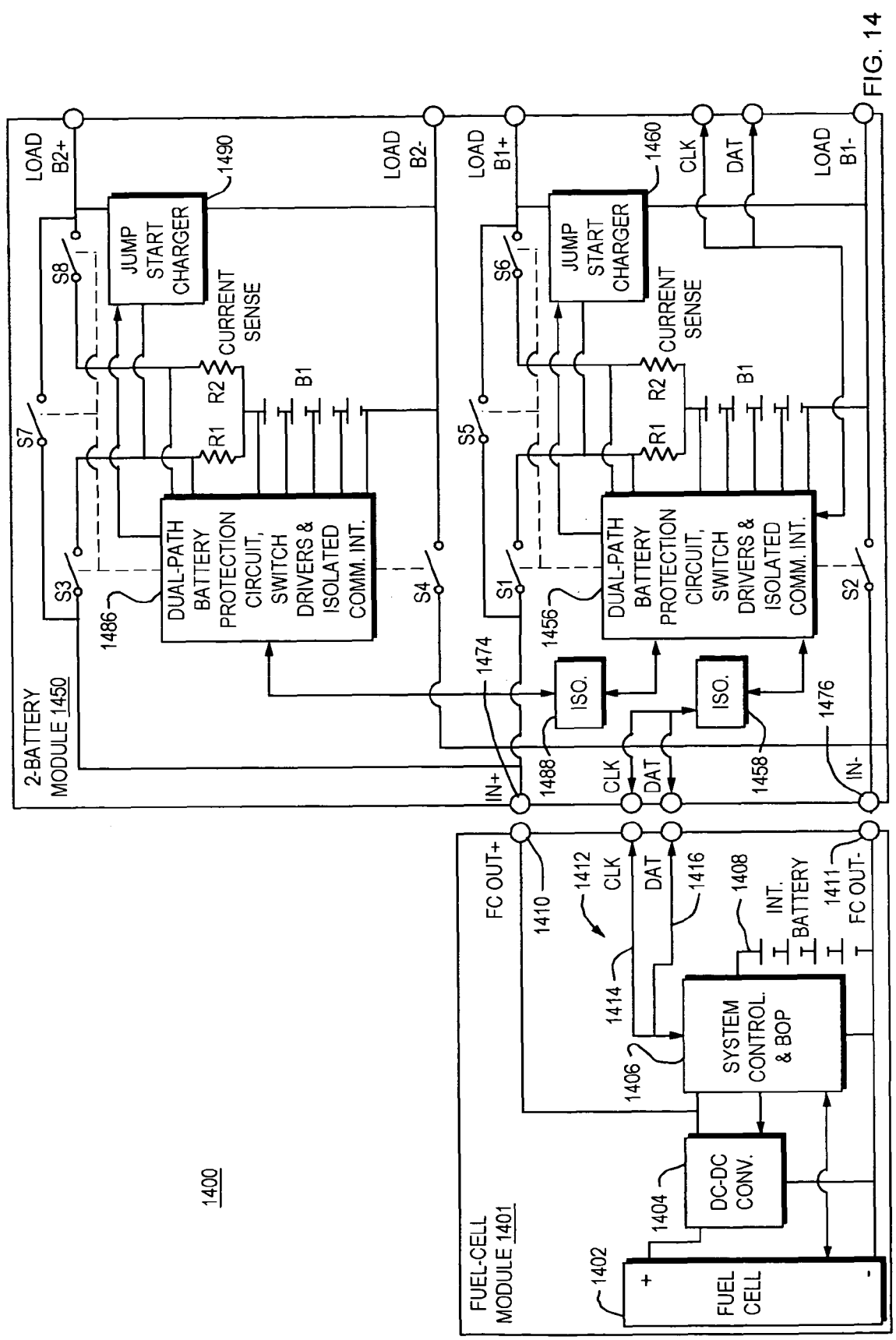
FIG. 14 illustrates a modular embodiment of the system in FIG. 12 with an internal battery in the fuel cell module similar to FIG. 3.

FIG. 14 illustrates a modular embodiment of the system in FIG. 12 with an internal battery in the fuel cell module similar to FIG. 3. Specifically, the fuel cell module 1401 provides power to recharge the batteries B1 and B2 in the battery module 1450. The fuel cell module 1401 includes a fuel cell 1402, which provides power to a DC-DC converter 1404. The module 1401 also includes a system controller and balance of plant block 1406 which operates in a manner similar to that described herein. An optional internal battery 1408 is large enough to provide start up power from a frozen state if the batteries in module 1450 are dead.

The fuel cell module 1401 is also provided with a communication interface 1412 which has a clock line 1414 and a data line 1416. The fuel cell module 1401 is coupled to the battery module 1450 at FC_out+ terminal 1410 which is coupled to battery In+ terminal 1474, and at FC_Out_terminal 1411 coupled to battery In– terminal 1476.

The battery module 1450 includes batteries and B2. The battery B1 stage includes a battery charging path such that when the switches S1 and S2 are closed, current flows through current sense resistor R1 and into the battery B1 to charge it. The dual path battery protection circuit, switch drivers and SMBus communications interface are shown illustratively as block 1456. This circuit 1456 protects the battery B1 from overcurrent and/or overvoltage states, as well as low voltage states and drives the switches accordingly. It also communicates with the system controller and balance of plant block 1406, through an isolation barrier 1458, which may be any suitable component as described herein. If the system controller and balance of plant block 1406 is signaling the battery protection circuit 1456 to recharge the battery B1, and yet the battery B1 itself is not in the appropriate state for recharging, e.g., because it is already charged, then the battery protection block 1456 overrides the system controller 1406 and force switches S1 and S2 to remain open. If both batteries are charged the fuel cell system will shut down and wait for the batteries to be partially discharged before turning on again to recharge the batteries.

Turning now to the load current path, the switch S6, when closed, allows current to flow from battery B1 through the current sense resistor R2, and through the switch S6 to the load. A bypass switch S5 allows current to flow directly from the fuel cell to the load for certain applications of the invention such and charging an external rechargeable battery. An optional jump start charger 1460 is provided for the case in which either or both of the batteries B1 and B2 are shut down or discharged. The 2-battery module 1350 may have a similar jump start charger.

Similarly, the B2 stage of the battery module contains a battery charging path such that when the switches S3 and S4 are closed, current flows through current sense resistor R3 and into the battery B2 to charge it. The dual path battery protection circuit, switch drivers and communications interface are shown illustratively as block 1486. This circuit 1486 protects the battery from overcurrent and/or overvoltage states, as well as low voltage states and drives the switches accordingly. It also controls the communications from the system controller and balance of plant block 1406, through an isolation barrier 1488, which may be any suitable component as described herein, from the other dual path battery protection circuit, switch drivers and isolated communications interface 1456. If the system controller and balance of plant block 1406 is signaling the battery protection circuit 1486 to recharge the battery B2, and yet the battery B2 itself is not in the appropriate state for recharging, then the battery protection block 1486 overrides the system controller 1406 and force switches S3 and S4 to remain open. If the battery B2 is to provide current to the load, then switch S8 is closed. Bypass switch S7 can be used to close the circuit between the fuel cell and the load if desired in particular applications of the invention. An optional jump start trickle charger 1490 can be provided in this module as well in a manner similar to that described with reference to the B1 stage.

By way of further description, the system controller 1406 uses the fuel cell 1402 to keep the internal battery 1408 fully charged substantially at all times so that if the external battery module 1450 is disconnected, the internal battery 1408 will have maximum shelf life so that the powerpack 1400 can be restarted even a dead external battery module 1450 is attached. If the external battery module 1450 has charge, the powerpack 1400 can start from the external battery even if the internal battery 1408 is dead.

The 2-battery powerpack 1400 illustrated in FIG. 14 has switch networks and isolated communications so that the fuel cell module 1401 can charge either B1 or B2, independent of how B1 and B2 may be connected at the load terminals. The battery module 1450 contains the novel dual current paths as described herein for each battery so as to minimize the number of switches in the path of the load current and to allow the fuel cell module 1401 to continue charging even if a problem on the load connection triggers the output protection switches S5 and S6 to open.

Power for jump starting the power pack when its batteries are dead can be connected to the available load terminals as described above in the preferred embodiment, or can be connected to a different connector.

The systems described above with two isolated batteries could easily be extended to systems with more than two isolated batteries and are included in this invention. In addition, the batteries in multibattery systems may be permanently connected in series for some applications in which case the switch networks and isolated communication links of FIGS. 8-10 may be simplified because of the known voltage ranges, e.g., the switches may no longer need to block current in both directions when off because the polarity can no longer be reversed, thus enabling the use of single MOSFETs rather than back-to-back MOSFETs.

The foregoing description has been directed to specific embodiments of the invention. It will be apparent, however, that other variations and modifications may be made to the described embodiments with the attainment of some or all of the advantages of such. Therefore, it is the object of the appended claims to cover all such variations and modifications as come within the true spirit and scope of the invention.

What is claimed is:

1. A rechargeable power pack comprising:
   a. a fuel cell stack;
   b. a DC-DC converter coupled to receive the output of said fuel cell stack;
   c. a first battery and associated battery protection circuit;
   d. a second battery and associated battery protection circuit, and said DC-DC converter being coupled between the output of the fuel cell stack and a dual path, said dual path having power paths leading to each of said first and second battery;
   e. a system controller and balance of plant assembly configured to receive a signal indicative of a charge characteristic of each battery and to control operating characteristics of said fuel cell;
   f. at least one isolation circuit between said first and said second associated battery protection circuits, and between said first associated battery protection circuit and said system controller and balance of plant assembly; and
   g. a switch network defining one or more of said power paths, said switch network having:
      (i) a first set of switches associated with said first battery, including a pair of switches coupled across said first battery and associated battery protection circuit which, when closed, allows current to flow such that the fuel cell stack charges the first battery, and a third switch which couples the first battery to provide power to an associated load that is being powered by the rechargeable power pack, said first set of switches having at least one switch driver that is in turn powered by the first battery; and
      (ii) a second set of switches associated with said second battery, including a pair of switches coupled across said second battery and associated battery protection circuit which, when closed, allows current to flow such that the fuel cell stack charges the second battery, and a third switch in the second set of switches, which couples the second battery to provide power to the associated load, said second set of switches having at least one switch driver that is powered by the second battery;
   said controller being programmed to operate the sets of switches such that when one battery is powering the load, the other battery is being charged by the fuel cell, in non-fault conditions.

2. The power pack as defined in claim 1 further comprising:
   (i) said first set of switches further comprising an associated first voltage sense and switch driver device that is powered by the first battery; and
   (ii) said second set of switches further comprising an associated second voltage sense and switch driver device that is powered by the second battery.

3. The power pack as defined in claim 2 further comprising:
   one or more isolation barriers for carrying digital signals to each of said switch drivers and for feeding the voltages of the first and second batteries, respectively, back to said system controller and balance of plant assembly.

4. The power pack as defined in claim 2 wherein said system controller and balance of plant assembly are powered by a third, internal battery.

5. The power pack as defined in claim 2 wherein said system controller and balance of plant assembly are powered by said second battery.

6. The power pack as defined in claim 2 further comprising a controller and switch driver coupled to one of said first and second batteries such that it is programmed to select one of said sets of switches to be closed at a time.

7. The power pack as defined in claim 2 further comprising one or more auxiliary batteries coupled to be charged by said power pack.

8. The power pack as defined in claim 2 further comprising one or more auxiliary batteries coupled to start up said fuel cell.

9. The power pack as defined in claim 6 further comprising a communications bus having clock and data bands for sending information between one or more of the system controller, the switch drivers, the rechargeable battery and the battery protection and power path control circuit.

10. The power pack as defined in claim 1 further comprising a current sense resistor connected to one side of each of said first and second battery, respectively, and an additional switch associated with an opposite side of each of said first and second battery, respectively, for further battery protection.

* * * * *